April 22, 1958 J. J. RADOMSKI ET AL 2,831,922

TELEPHONE SUBSTATION

Filed May 6, 1953 2 Sheets-Sheet 1

INVENTORS
Joseph J. Radomski
Carl M. Wenrich
and Paul N. Shaaber
BY J. Preston Swecker
ATTORNEY April 22, 1958 J. J. RADOMSKI ET AL 2,831,922

TELEPHONE SUBSTATION

Filed May 6, 1953 2 Sheets-Sheet 2

INVENTORS
Joseph J. Radomski
Carl M. Wenrich
and Paul N. Shaaber
BY J. Preston Swecker
ATTORNEY United States Patent Office 2,831,922
Patented Apr. 22, 1958

2,831,922

TELEPHONE SUBSTATION

Joseph J. Radomski, Carl M. Wenrich, and Paul N. Shaaber, Reading, Pa., assignors to Gai-Tronics Corporation, Reading, Pa., a corporation of Delaware Application May 6, 1953, Serial No. 353,254
11 Claims. (Cl. 179—1)

Figure 1:
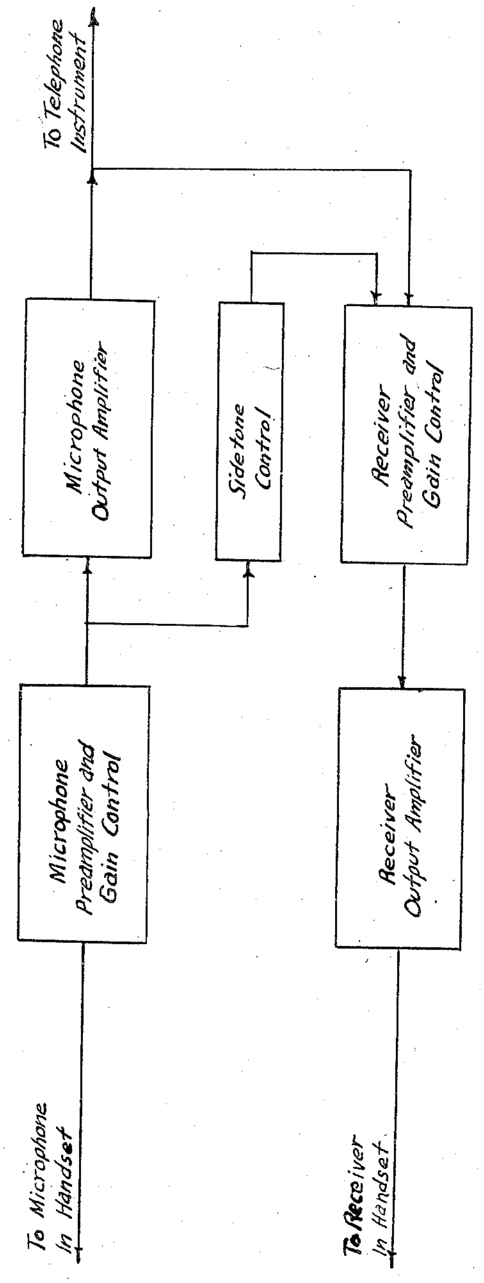

This invention relates to a telephone substation particularly adapted for use in areas where a high noise level prevails, such as in factories, power plants, and certain outdoor locations.

In the past booths have been installed in many high noise level areas to isolate the operator and the telephone set from the surrounding noise. However, this expedient does not constitute a satisfactory solution to the problem of providing dependable voice communication of high clarity to and from such areas. In many places in which it would be desirable to use a telephone, a telephone booth cannot be accommodated at all because of its large size, and in many other areas the presence of a booth would be objectionable.

This invention provides a telephone substation having high clarity, excellent volume, fidelity of tone, and side-tone control which can be used in high noise level areas to far greater advantage and with exceedingly greater satisfaction than the conventional telephone in a well designed booth. Its very comfortable level of audibility eliminates such inconveniences as the inability to hear with ease or to be understood clearly at another station.

A telephone substation according to this invention generally comprises a high quality microphone, a standard telephone receiver, and amplifier means for both transmission and reception of voice powered from the normal commercial lighting circuit.

The voice transmitter is capable of more than adequate discrimination between the speaker's voice and the ambient noise in the area. The microphone used is preferably of the dynamic type which has low sensitivity and excellent frequency response characteristics for audio frequencies. This microphone is highly insensitive to extraneous sound waves, and, in fact, will respond only to the voice which is in close proximity to it. The sensitivity falls off rapidly for each inch of distance between the source of the sound waves and the microphone. Additionally, this type of microphone is not affected by humidity or temperature changes as much as other types. The small audio signal developed in the microphone is amplified by an amplifier capable of raising the level of the microphone while maintaining excellent frequency response characteristics throughout the voice range.

Furthermore, the increased volume, clarity and fidelity, and the freedom from side-tone of the earpiece or receiver produces a very comfortable hearing level which, in effect, takes precedence over or greatly subordinates the external noises.

In order to adapt the substation for use under a variety of external conditions, gain controls are provided for both receiving and transmitting, and variable side-tone elimination is provided for the receiver.

The design of the amplifier has been arranged to accept a signal from a 600 ohm source, amplify it and deliver the amplified signal with excellent fidelity and clarity to the telephone receiver. It has also been designed to accept a signal from a low impedance (30 ohms) source, amplify it, and deliver it into a 600 ohm load at a power level sufficient for the purpose, maintaining excellent frequency response characteristics and good output regulation throughout the voice range. It has also been designed so that part of the microphone channel signal may be inserted into the earpiece or receiver channel in such a way as to cancel itself out, thereby eliminating side-tone. The design of this side-tone elimination circuit is such that there is no effect on a signal which originates on the telephone line or circuit, and so the wanted signal may be raised to any desired volume level by means of the receiver amplifier without an attendant rise in noise originating in the microphone of the associated handset. Because of the effect that lack of side-tone in the receiver may have on an operator in a relatively quiet area, the degree of side-tone elimination is adjustable.

Figure 2:
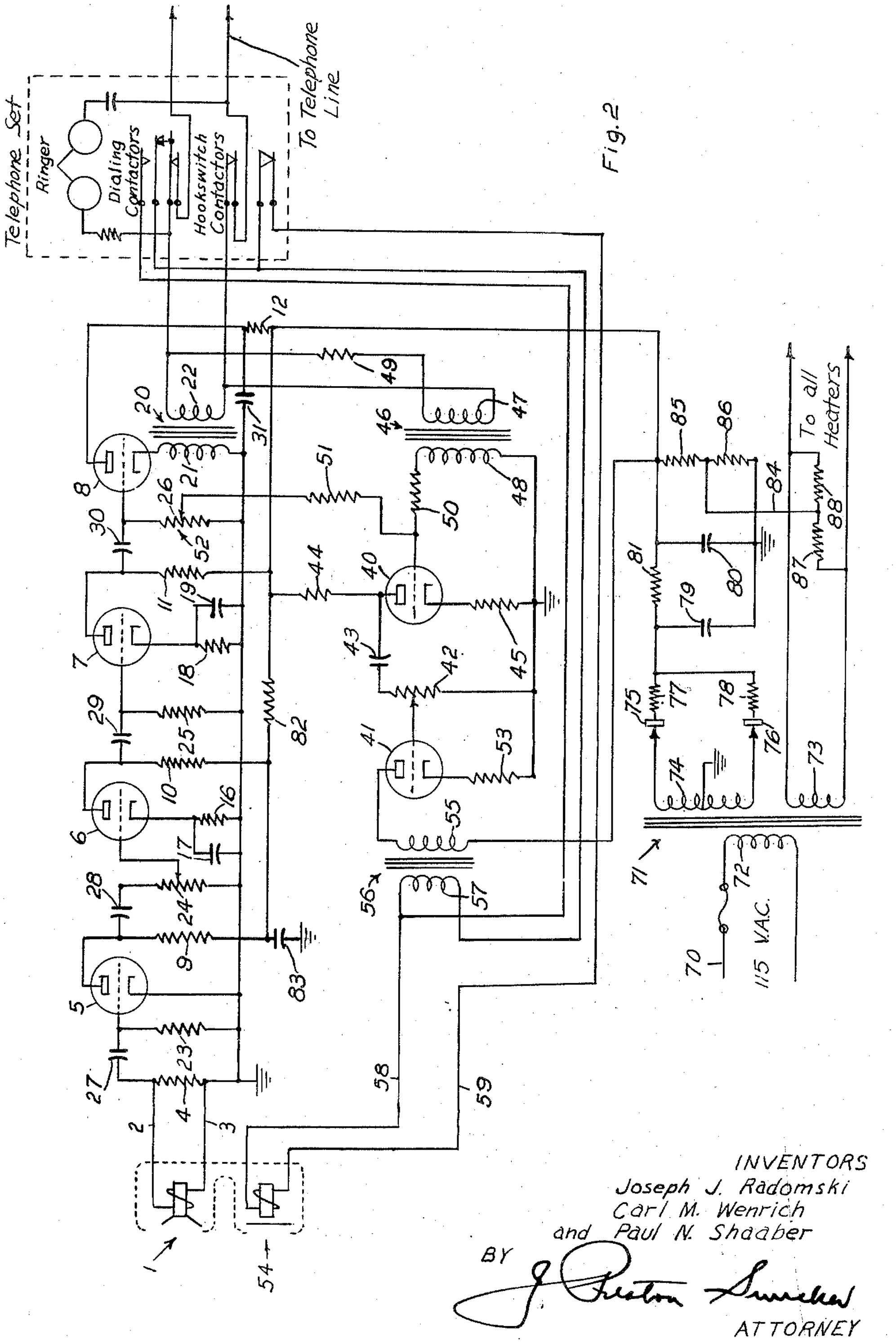

Other features and advantages of this invention will appear as the detailed description proceeds in connection with the accompanying drawing in which:

Fig. 1 is a block diagram showing a novel telephone substation according to this invention; and Fig. 2 is a schematic diagram of a circuit for the telephone substation of Fig. 1.

A telephone set embodying this invention conveniently may be of the handset type wherein the microphone and the earpiece are carried by a single member. Such member is connected by a flexible shielded cord to a stand member which serves as the amplifier chassis.

As indicated in Fig. 1, the signal developed by the microphone in the handset passes first to a preamplifier and gain control and then to an output amplifier to be delivered on the telephone line to another instrument. A signal from the telephone line passes to the receiver in the handset through a preamplifier and gain control and through an output amplifier. Side-tone control is achieved by feeding a portion of the signal from the microphone channel directly to the receiver channel. The amplifiers may be of the vacuum tube type, the transistor type, or any other type having good frequency response characteristics. A better understanding of the telephone substation of this invention will be gained from the following discussion of a specific example which has been found to be satisfactory in practice.

The microphone 1 diagrammatically illustrated in Fig. 2 is a low impedance (30 ohm) dynamic microphone. It will be understood, however, that other types of microphones, having low sensitivity and good frequency response characteristics, could be used if desired. In the case of the dynamic microphone, movement of the diaphragm in response to sound waves generates a small potential corresponding in wave form to the sound waves. This signal is transmitted through leads 2 and 3 to the amplifier chassis where it appears across a resistor 4 having an impedance substantially equal to the characteristic impedance of the microphone 1.

The transmission channel of the amplifier preferably comprises four electron discharge devices or stages, two pre-amplifier stages 5 and 6, a driver stage 7, and an output stage 8. For convenience of illustration, each of the electron discharge devices is shown as having a separate envelope. In practice, however, a more convenient arrangement is achieved by using twin-triode tubes. For example, pre-amplifier stages 5 and 6 may be the two sections of a twin-triode tube of the type now commonly sold under the code number 12AX7, driver stage 7 may be one section of another 12AX7 twin-triode tube, and output stage 8 may be one section of a twin-triode tube of the type now commonly sold under the code number 12AU7.

The plates or anodes of electron discharge devices 5, 6 and 7 are connected to the B+ side of the circuit through suitable resistances 9, 10 and 11, which in the example given may be 470 kilohm resistors. The plate or anode circuit of output stage 8 includes a resistance 12 which may be a 12 kilohm resistor.

The cathodes of the electron discharge devices 5—7 are connected to ground, suitable couplings being inserted as required. In the example previously mentioned, a 14 kilohm resistor 16 and a 20 microfarad capacitor 17 are associated with the cathode of the second preamplifier stage 6, and a 14 kilohm resistor 18 and a .005 microfarad capacitor 19 are associated with the driver stage 7. The cathode circuit of output stage 8 includes the primary winding 21 of a suitable transformer 20 which may be of the type designated by the code number UTC CG–140. The secondary winding 22 of the transformer 20 transmits the amplified audio signal to the telephone line. A capacitance 31, which may be a 20 microfarad capacitor, is shown between the cathode and the anode circuits of the output stage 8.

In order to minimize frequency distortions in frequencies within the audio range, resistance-capacitance couplings are used between the amplifier stages and between resistor 4 and the first stage 5. In the example given, resistance 23 may be 6 megohms, resistances 24 and 26 may be 2 megohms, resistance 25 may be 2.2 megohms, capacitance 27 may be .005 microfarad and capacitances 28, 29 and 30 may be .002 microfarad. Resistor 24 is connected potentiometer fashion to the grid of stage 6 to serve as a gain control.

It should be noted that the output stage 8 is applied as a cathode follower, with the primary winding 21 of the transformer 20 serving as the cathode load. The secondary winding 22 of this transformer will deliver power into a 600 ohm load. Because the output stage is completely degenerative, the distortion generated by the power amplifier is negligible, and the effect of varying load impedances is also minimized. Therefore, good output regulation is achieved.

The receiver channel of the amplifier preferably has two stages 40 and 41 coupled by a resistance 42 and a capacitance 43. Conveniently, the preamplifier triode 40 may be the other section of the 12AX7 twin-triode which provided stage 7 of the transmission channel, and the output triode 41 may be the other section of the 12AU7 twin-triode which provided stage 8. The coupling resistance 42 may be 2 megohms and the coupling capacitance 43 may be .002 microfarad. The plate of the electron discharge device 40 is connected to the B+ side of the circuit through a resistance 44, 470 kilohms for example. The cathode of the tube 40 is connected to ground through a resistance 45, 14 kilohms for example, and the cathode of tube 41 is connected to ground through a resistance 53, 2.7 kilohms, for example. The input impedance of the receiver channel is 600 ohms which matches the standard telephone line impedance, and the output impedance is approximately 115 ohms, which is the characteristic impedance of the handset, so that maximum power may be delivered to the receiver without distortion.

The incoming audio signal from the telephone line appears across the primary winding 47 of an input transformer 46, the secondary winding 48 of which is located in the grid circuit of the stage 40. Transformer 46 may be of the type now sold under the code number ADC 208–A. In series with the primary winding 47 of the transformer 46 is a resistance 49 which serves to unload the telephone line so that the microphone channel may have its proper operating conditions.

The resistance 49 may be 2.7 kilohms, for example. A resistor 50, 51 kilohms, for example, is interposed between the grid of the triode 40 and the secondary winding 48 of the transformer 46 to decouple to a slight extent the transformer 46 from the triode 40.

Also in the grid circuit of the receiver channel preamplifier 40 is a resistor 51 connecting the grid of the pre-amplifier to the movable contact of a potentiometer 52 which comprises the resistor 26 in the grid circuit of the microphone channel output stage 8. Resistor 51 may be 240 kilohms for example. It will be seen, therefore, that two signals may be impressed simultaneously upon the grid of the pre-amplifier 40, one from the potentiometer 52 and one from the telephone line. It will also be seen that the signal appearing across the telephone line is composed of two principal components. One component is the signal being transmitted from some other substation, and the other component is the side-tone imposed upon the line by the microphone channel.

According to this invention, the polarity of the transformers 20 and 46 is such that the side-tone component of the line signal and the signal from the potentiometer 52, which is also side-tone, are 180 degrees out of phase. Since the magnitude of the signal from the potentiometer 52 may be adjusted as desired by movement of the movable contact along the resistor 26, all or any part of the side-tone delivered from the telephone line by the transformer 46 may be eliminated. Thus, the amount of side-tone allowed to reach the earpiece of the handset may be controlled so as to produce the type of signal which is most desirable under the existing conditions. The range of adjustment is complete, that is, from no side-tone reduction to complete side-tone elimination.

In very noisy areas complete elimination of side-tone greatly increases the audibility of the incoming signal. In quieter areas, however, complete elimination of side-tone is unnecessary and is even objectionable to some persons. Being accustomed to using other instruments, such persons find that complete elimination of side-tone in a quiet area has a distracting effect. For this and other reasons, it may be desirable in some applications to permit some or all of the side-tone from the telephone line to pass to the earpiece.

Gain control in the receiver channel of the amplifier is achieved by connecting the coupling resistor 42 in potentiometer fashion to the grid of the output triode 41.

As indicated in the diagram, the receiver amplifier channel has a transformer output to the earpiece or receiver 54. The primary winding 55 of the transformer 56, preferably a Merit A 3013 transformer, is located in the plate circuit of the output stage 41, and the secondary winding 57 is located in the earpiece circuit.

Numeral 70 designates the customary, alternating current, commercial lighting circuit. In most cases this will be the most convenient source of power for the amplifier of this invention. However, if necessity dictates, alternating current could be supplied through an inverter from a battery.

The power transformer 71, which may be of the type now sold under the designation Stancor PS–8416, comprises a primary winding 72 in the power supply circuit 70, a low voltage heater winding 73 for the electronic tubes, and a center-tapped high voltage winding 74. Two selenium half wave rectifiers 75 and 76 are connected to winding 74 as indicated in the diagram to provide full wave rectification. Resistances 77 and 78 each may be 560 ohms. Pulsations in the rectified current are minimized by a condenser input, resistance-capacitance filter, comprising condensers 79 and 80 and resistor 81. As an example of a suitable filter unit, capacitance 79 may be 15 microfarads, capacitance 80 may be 30 microfarads, and resistance 81 may be 3300 ohms.

In order to minimize hum and to prevent feedback through the power supply, there is provided an additional resistance-capacitance decoupling consisting of resistance 82 and capacitance 83 in the B+ circuit to the voltage amplifier stages. Resistance 82 may be 51 kilohms, and capacitance 83 may be 40 microfarads.

Heater winding 73 of transformer 71 supplies alternating current at about 6.3 volts to the heaters of the cathodes of the triodes 5, 6, 7, 8, 40 and 41. The hum developed in the tubes because of emission from the heaters to the cathodes as the heater potential becomes negative is minimized by biasing the heater circuit with about 4 volts direct current potential. In practice this is accomplished by a tapped bleeder 84 connected to the B+ circuit as shown. Suitable values for resistances 85, 86, 87 and 88 are 68 kilohms, 4.5 kilohms, 270 ohms, and 270 ohms, respectively.

A telephone substation according to this invention may include a hookswitch, a dial, a ringer, and push button selectors for multiple lines, together with a hold device for use when transferring from one line to another. Some of these features are diagrammatically indicated in Fig. 2. As shown, the dial contactors and the hookswitch contactors are connected in a conventional manner to the telephone line or circuit and to the earpiece leads 58 and 59 so that there is no output from the earpiece while the handset is in its cradle, and so that there is no disturbance in the earpiece during dialing. These features are not described specifically because they are found in conventional telephone substations, and the substation of this invention does not in any way prevent the inclusion thereof.

It will be apparent to those skilled in the art that the utility of the telephone, as a means of communication, has been greatly increased by this invention. For example, a telephone instrument embodying this invention, supplied with an extension cord to allow the handset to be moved a considerable distance away from the other part of the instrument, could be used advantageously by an operator of a switchboard supervising power instruments. The operator could walk about in the vicinity of the instruments and convey the readings observed to a recorder regardless of the noise in the immediate area. Many other examples will suggest themselves to those concerned with this field.

Although this invention has been described with reference to the details of a specific embodiment, various changes will be apparent to those skilled in the art. Consequently, the scope of the invention is to be limited by the claims which follow rather than by the foregoing description.

We claim:

1. A telephone substation for connection to a telephone line comprising a microphone, a microphone channel having an input for receiving signals from said microphone and an output for delivering such signals to said telephone line, a receiver, a receiver channel having an input for receiving signals from said line and an output for delivering the signals to the receiver, side-tone control means delivering a portion of the signal from said microphone channel directly to said receiver channel with a polarity such as to cancel out a portion of the same signal passing from the output of said microphone channel to the input of said receiver channel, and means for adjusting said side-tone control means so as to regulate the amount of side-tone elimination.

2. A telephone substation for connection to a telephone line comprising a microphone; a microphone channel having an input for receiving signals from said microphone, an amplifier for amplifying such signals, and an output for delivering such signals to said telephone line; a receiver; a receiver channel having an input for receiving signals from said line and an output for delivering the signals to the receiver; side-tone control means delivering a portion of the signal from said microphone channel directly to said receiver channel with a polarity such as to cancel out a portion of the same signal passing from the output of said microphone channel to the input of said receiver channel; and means for adjusting said side-tone control means so as to regulate the amount of side-tone elimination independently of the gain of said amplifier.

3. A telephone substation for connection to a telephone line comprising a microphone; a microphone channel having an input for receiving signals from said microphone, an amplifier for amplifying such signals, gain control means for said amplifier, and an output for delivering such signals to said telephone line; a receiver; a receiver channel having an input for receiving signals from said line, an amplifier for amplifying such signals, gain control means for the last-mentioned amplifier, and an output for delivering the signals to the receiver; side-tone control means delivering a portion of the signal from said microphone channel directly to said receiver channel with a polarity such as to cancel out a portion of the same signal passing from the output of said microphone channel to the input of said receiver channel; and means for adjusting said side-tone control means so as to regulate the amount of side tone elimination independently of the gain of either of said amplifiers.

4. A telephone substation adapted for connection to a telephone line in areas where a high noise level prevails comprising a dynamic microphone, first amplifier means coupled to said line and to said microphone to amplify the audio signals developed by said dynamic microphone and deliver them to said line, first gain control means for said first amplifier means, an earpiece, second amplifier means coupled to said line and to said earpiece to amplify audio signals from said line and deliver them to said earpiece with sufficient volume to subordinate external noises, second gain control means for said second amplifier means operable independently of said first gain control means, and manually regulatable means for adjusting the amount of side-tone passing from said microphone to said receiver independently of said amplifier and gain control means over the entire range from no side-tone elimination to complete side-tone elimination.

5. A telephone substation comprising a pair of terminals for connection to a telephone line; a microphone; a microphone channel having an input for receiving signals from said microphone, an amplifier for amplifying such signals, gain control means for said amplifier, and an output for delivering such signals to the telephone line; a receiver; a receiver channel having an input for receiving signals from said line, an amplifier for amplifying the signals received, gain control means for the last-mentioned amplifier; connector means connected in potentiometer fashion to the microphone channel between the gain control and the output thereof and connected to the receiver channel between the input and the gain control thereof to transmit a regulatable portion of the signal on the microphone channel directly to the receiver channel; and means connecting the output of said microphone channel and the input of said receiver channel to said terminals in such a way that a signal passing from the output of the microphone channel to the input of the receiver channel will arrive at the point of connection between said receiver channel and said connector means substantially one-hundred and eighty degrees out of phase with respect to the signal passing to said point by way of said connector means.

6. A telephone substation comprising a pair of terminals for connection to a telephone line, a microphone, a receiver, an electronic amplifier, means for imposing signals from said microphone upon the grid of said amplifier, a first transformer having a primary winding connected to the cathode of said amplifier and a secondary winding connected to said terminals to transmit the amplified signals to said telephone line, a second transformer having a primary winding connected to said terminals to receive signals from said line and a secondary winding coupled to said receiver, and connector means connecting the grid of said amplifier and the secondary winding of said second transformer, the secondary winding of said first transformer and the primary winding of said second transformer being so connected to said terminals that the signals imposed upon the secondary winding of said second transformer from said first transformer are substantially one-hundred and eighty degrees out of phase with respect to the signals transmitted to said secondary winding by said connector means so that only that part of the signal imposed on said second transformer which is not cancelled out by the signal from the connector means will be transmitted to said receiver.

7. A telephone substation for connection to a telephone line comprising a microphone, a first electron discharge device connected to said microphone to amplify the signal from said microphone and deliver it to said telephone line, a receiver, a second electron discharge device connected to said receiver to amplify the signal from said telephone line and deliver it to said receiver, a potentiometer in the grid circuit of said first electron discharge device, and means connecting the movable contact of said potentiometer to the grid circuit of said second electron discharge device, the connections between said electron discharge devices and said telephone line and between said potentiometer and the grid circuit of said second electron discharge device being such as to cause that portion of a signal passing from said microphone to said second electron discharge device by way of said line to be out of phase with that portion of the signal passing from said microphone to said second electron discharge device by way of said potentiometer.

8. In a telephone substation, an output circuit comprising an electron tube, a transformer having a primary winding in the cathode circuit of said electron tube, a secondary winding on said transformer adapted to be connected to telephone lines, an input circuit comprising a second transformer, the primary of said second transformer being adapted to connect across said telephone lines, a secondary winding on said second transformer connected to the input circuit of a second electron tube, and means connecting together the input circuits of said electron tubes.

9. In a telephone substation, a first electron control device, a second electron control device, means connecting together the input circuits of said first and second electron control devices, first transformer means connected to said first electron control device, means for electrically isolating said first transformer means from said input circuits, second transformer means connected to the input circuit of said second electron control device and to said first transformer means, said first and second transformer means having their windings so poled that the feedback from the first transformer means via the second transformer means to the common input connection is 180° out of phase with the initial input to the first electron control device.

10. In a telephone substation, a first electron control device, a second electron control device, first coupling means connecting the input circuits of said first and second electron control devices together, and second coupling means for connecting the output circuit of said first electron control device to the input terminal of said second electron control device, said second coupling means including means for producing a phase reversal.

11. In a telephone substation, a receiver channel, a transmitter channel, resistor means coupling the input circuits of the channels, and phase reversing means coupling the output of the transmitter channel to the input of the receiver channel, whereby that portion of any transmitted signal which is fed back to the receiver channel bears a negative phase relationship to the same signal as it appears on the input circuits of the channels.

References Cited in the file of this patent

UNITED STATES PATENTS

| | | |
|---|---|---|
| 2,252,679 | Hawkins | Aug. 12, 1941 |
| 2,282,404 | Herrick | May 12, 1942 |
| 2,385,265 | Foley | Sept. 18, 1945 |
| 2,511,948 | Wang | June 20, 1950 |